United States Patent [19]
East

[11] Patent Number: 5,400,037
[45] Date of Patent: Mar. 21, 1995

[54] SELF-FOCUSING ANTENNA ARRAY

[76] Inventor: Thomas W. R. East, 516 Fallingbrook Drive, Waterloo, Ontario, Canada, N2L 4N3

[21] Appl. No.: 880,602
[22] Filed: May 8, 1992

[30] Foreign Application Priority Data

May 31, 1991 [GB] United Kingdom ............... 9111668

[51] Int. Cl.[6] .................. H01Q 3/22; H01Q 3/24; H01Q 3/26
[52] U.S. Cl. .................. 342/372; 342/354; 342/157; 342/173
[58] Field of Search ............... 342/157, 173, 174, 354, 342/372

[56] References Cited

U.S. PATENT DOCUMENTS 4,517,570  5/1985  Gray, Jr. ............... 342/372

Primary Examiner—Theodore M. Blum
Attorney, Agent, or Firm—Anthony Asquith & Co.

[57] ABSTRACT

A phased array for transmitting to a microwave powered aircraft is focussed and steered by feedback from the aircraft. Each antenna of the array is phase modulated in turn, and the resulting amplitude modulation of the field at the aircraft is used to calculate a correction to the antenna phase, which is telemetered back to the array system and applied to the antenna phase shifter.

13 Claims, 4 Drawing Sheets

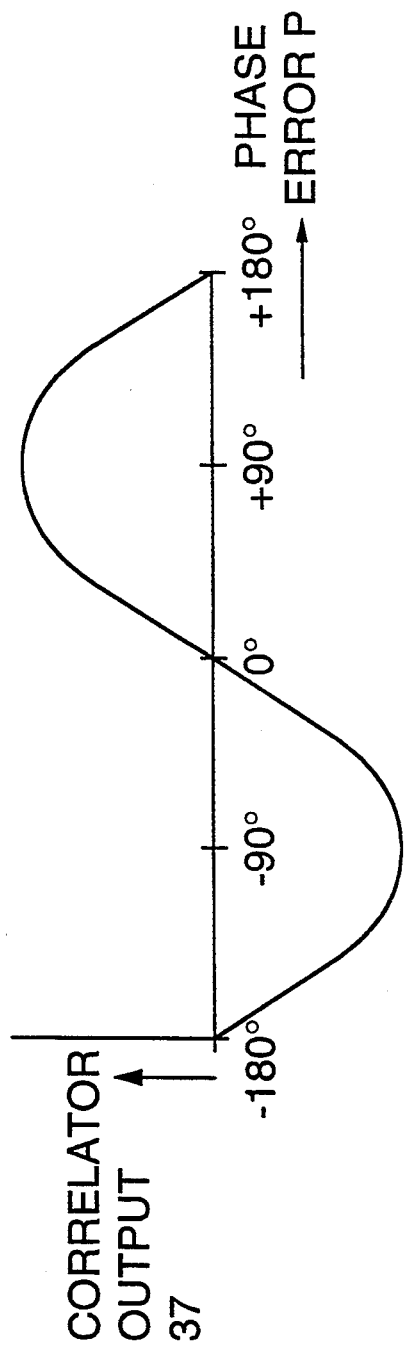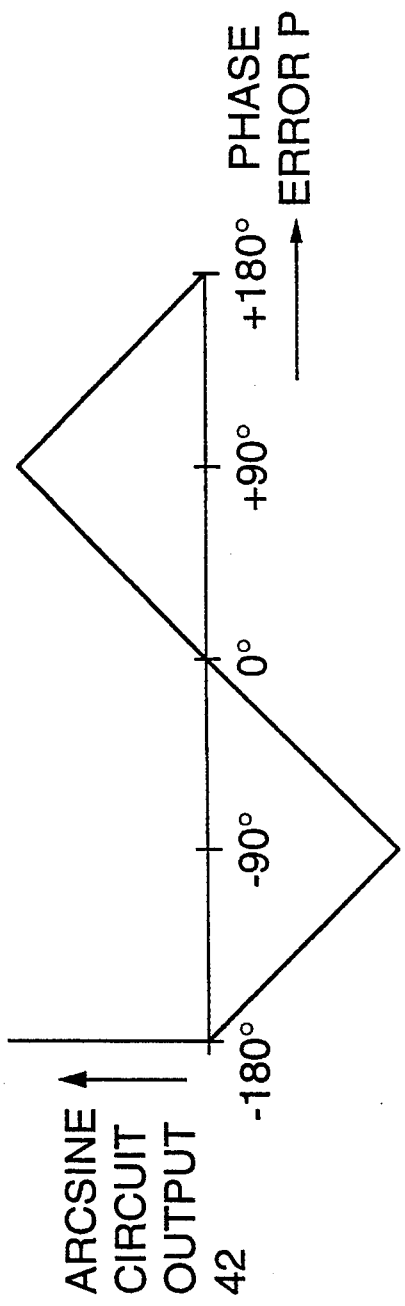

SELF-FOCUSING ANTENNA ARRAY

BACKGROUND OF THE INVENTION

1. Field of the Invention

This invention relates to an array of antennas used to transmit electromagnetic energy to a distant target, for example to an aircraft to provide its motive power, and more particularly to means for controlling the relative phases of the energy radiated by the various antennas so as to maximise continually the energy received at the target.

2. Discussion of the Prior Art

In a SHARP (Stationary High Altitude Relay Platform) system, a large ground antenna subsystem transmits microwave power to the airborne vehicle where the power is captured by a "rectenna" (a small array of antennas, each with its own rectifier) and used to propel the aircraft and to power the payload. If the ground subsystem consists of several steerable antennas, not only must each antenna be pointed at the target, but for maximum power transmission efficiency, the powers from the various antennas must arrive at the aircraft in phase. On the other hand, if a classical "phased array" is used, with a large number of fixed radiators, in order to form a beam at all and then to steer and focus it, the phases of the radiators must be adjusted either individually or at least in small groups so that the signals from the radiators all arrive at the target substantially in phase with each other.

In the description which follows, an antenna is an individual radiator or a group of radiators, in either case controlled by a single phase shifter.

The Problem

The problem is to adjust all the phase shifters in an array of antennas continually to keep the beam pointing at, and focussed on, the target. The Prior Art for doing this includes the conventional method: the retrodirective array; and the adaptive array.

Conventional Phased Array Technique

The conventional approach is to feed the antennas from a common source of carrier frequency power (the RF exciter) through equivalent cable lengths to form a boresight beam, then apply calculated phase shifts to allow for the off-boresight angle of the target. To achieve the boresight beam may require an extensive calibration procedure, which must be repeated periodically to correct for temperature and other disturbing effects. To aim the beam at the target requires a calculation of phase shift for each element, to be repeated as the target moves. Such a system is described in U.S. Pat. No. 4,445,119 by G. A. Works and assigned to Raytheon Company.

It should be noted that a parallel beam is not the optimum: for maximum efficiency the beam must converge on the target to an extent which depends on the distance of the target from the array: this may be important when transmitting microwave power to an aircraft.

Retrodirective Array

In the Retrodirective Array, the target vehicle carries a beacon which radiates a test signal, and the array of antennas on the ground receives this signal. Each antenna has a receiver which measures the phase of the received signal and the result is used to adjust the phase shifter of the element. Any retrodirective array must use either time division multiplexing (shutting off the main transmission while the test signal is received on the same frequency) or frequency division multiplexing (the test transmission is on a different frequency from the main transmission). In the case of frequency division multiplexing the phase shift through the receiving channel may differ from that through the transmitting channel, and if so, the difference must be allowed for. A retrodirective array using frequency division multiplexing is described in U.S. Pat. No. 3,151,326 by E. A. Ohm, assigned to Bell Telephone Laboratories Incorporated, and another is described in U.S. Pat. No. 3,334,346 by A. B. Crawford et al.

A technical paper by W. W. Waters in the July 1970 Transactions of the Aerospace and Electronic Systems Society of the Institute of Electrical and Electronics Engineers (IEEE) describes the use of signals returned from the target through the antennas of the array to adjust the phases of the power sent out by the antennas. A similar discussion is contained in a paper by Attia and B. D. Steinberg in the January 1989 issue of the Transactions of the Antennas and Propagation Society of the IEEE (Trans A & P). B. D. Steinberg describes adjustments to the phases in the elements of a radio camera in the January 1978 issue of Trans A & P. P. V. Brennan describes a self-phased array in the July 1989 issue of Trans A & P.

Adaptive Array

The concept of monitoring the signal radiated by a large antenna is described in U.S. Pat. No. 4,163,235 by J. L. Schultz and assigned to Grumman Aerospace Corporation. An array of lasers (not antennas) which is adaptively phased is described in U.S. Pat. No. 3,731,103 by T. R. O'Meara and assigned to Hughes Aircraft Company: the phases of all laser outputs are simultaneously modulated sinusoidally each at a unique frequency, and the resultant amplitude modulation of the combined field at the target is analysed back at the laser location to optimise the phases.

SUMMARY OF THE INVENTION

The problem

A microwave powered airborne vehicle obtains its power for sustaining flight by microwave power transmitted from a large antenna array on the ground, containing many phase shifters. In order to maximise the efficiency of power transfer to the target vehicle, these phase shifters must be controlled in such a way as to form, steer and focus the beam from the array on to power collecting antenna on the target vehicle. The conventional approach is to collimate the array to give a boresight beam and to apply commands to the phase shifters to steer the beam: the commands are calculated by a computer. The collimation has to be repeated to overcome drifts. Another approach is the Retrodirective Array in which the radiating elements also act as receiving antennas: for each phase shifter there is a receiver which detects a transmission from a beacon on the target and adjusts the phase shifter. The receivers add substantially to the cost of the array. Furthermore, in order to use the receivers frequently to adjust the array, either the transmitter must be switched off frequently, or the receivers have to be tuned to a different frequency from the transmitter without compromising the phase information.

Another approach, used in an optical application, is to apply low index sinusoidal phase modulation to all the sources continuously at different frequencies, and return a sample of the combined light at the target for analysis and correction of the average phases of the sources.

My invention describes a novel method of adapting an antenna array. As the vehicle moves, the phase of each antenna is tested in turn continually and its phase shifter adjusted so the resultant beam follows the vehicle. The antennas are sequentially phase modulated with square waves to plus and minus 90°, and the combined field is analyzed at the target, and correction signals sent back to the array by telemetry. The correction is made more rapid by an inverse sine function, and the phases of the antennas are continuously updated by tracking circuits.

An object of the invention is to simplify the system by using a single channel for the entire array for detecting required adjustments to each antenna instead of a receiving channel for each antenna. A further object of the invention is to adapt the array as rapidly as possible by making the corrections from each test as complete as possible, and by using tracking circuits to maintain correct phases even between tests.

Further advantages of my invention will become apparent in the following description.

BRIEF DESCRIPTION OF THE DRAWINGS

FIG. 4 shows the relationship between the signal sent down through the telemetry channel and the phase error P;

FIG. 5 shows the relationship between the phase correction applied to the selected phase shifter and the phase error P.

DESCRIPTION OF THE ILLUSTRATED EMBODIMENT

Figure 1:
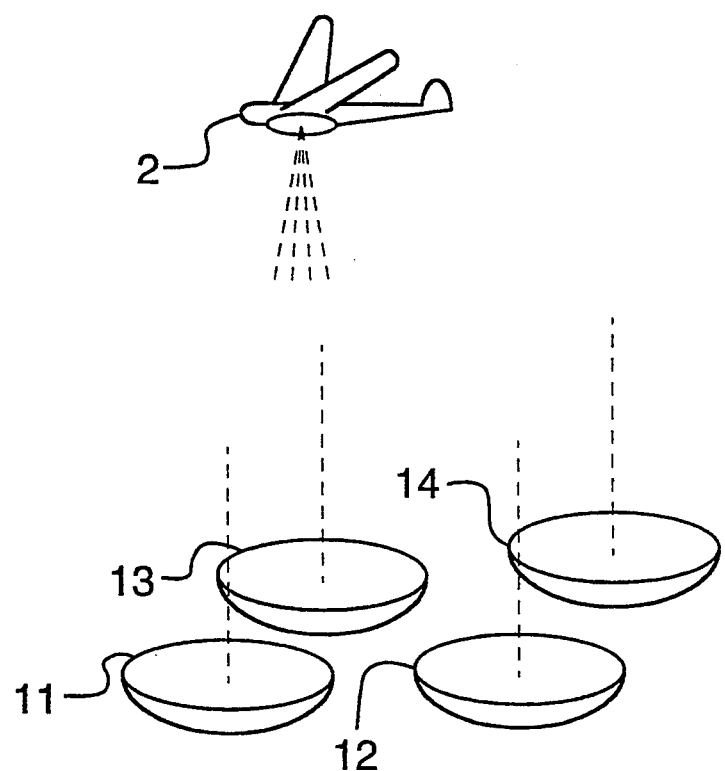
FIG. 1 is an elevation view of the ground antenna array and the target vehicle.

A further understanding of the present invention may be had by reference to the following description taken in connection with the accompanying drawings. Referring first to FIG. 1 an array of antennas mounted at the transmitting location consists of a plurality of antennas 1, either steerable or with fixed aiming direction in the general direction of the target 2.

Figure 2:
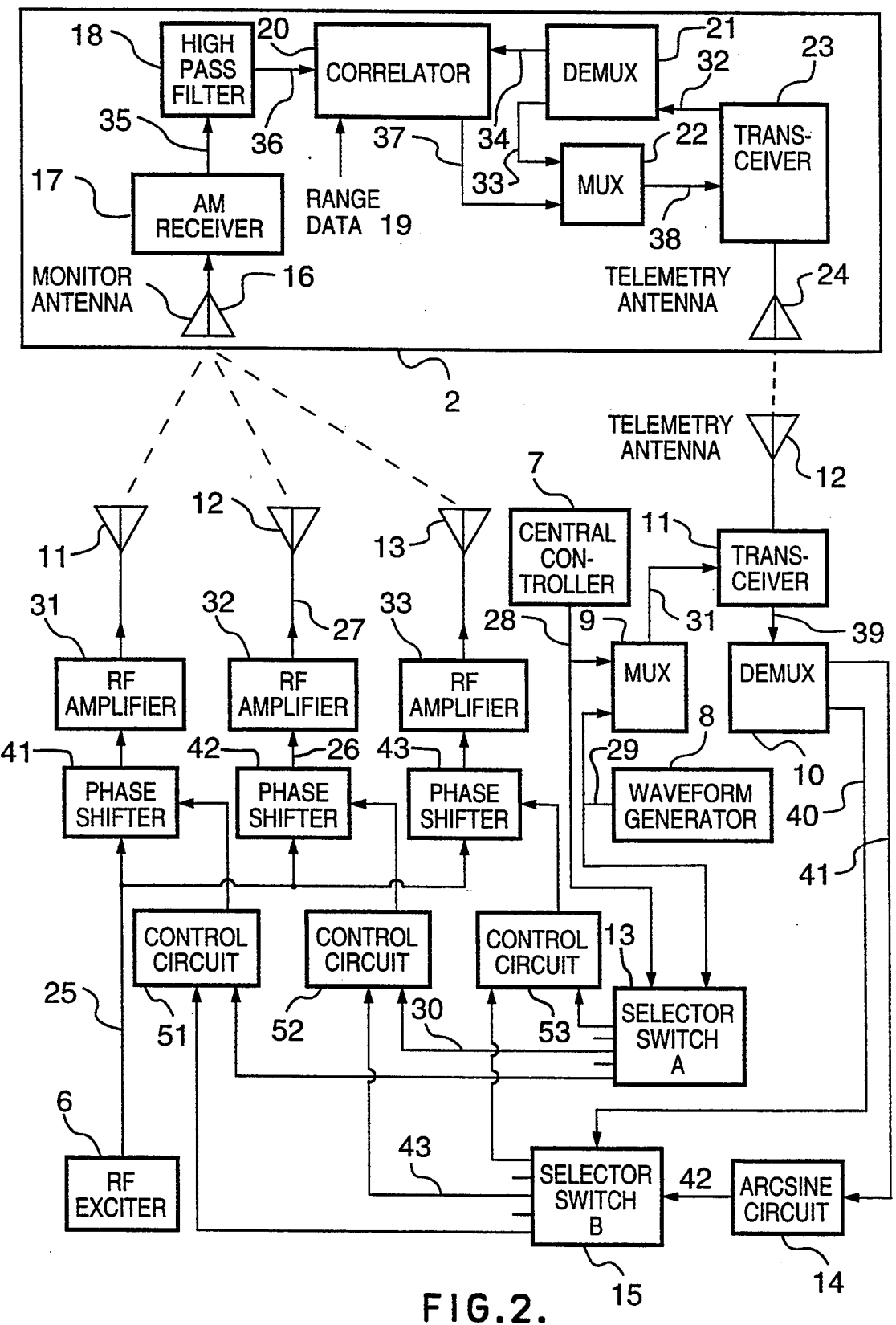
FIG. 2 shows, in schematic form, the main electrical components of the proposed system arranged in accordance with this invention.

Referring to FIG. 2, the elements at the transmitting location include the antennas 1, radio frequency amplifiers 3, phase shifters 4, control circuits 5, a radio frequency exciter 6, a central controller 7, a waveform generator 8, a first multiplexer 9, a first demultiplexer 10, a first telemetry transceiver 11, a first telemetry antenna 12, a first selector switch 13, an arcsine circuit 14, and a second selector switch 15. The elements in the target 2 include a monitor antenna 16, an amplitude modulation receiver 17, a high pass filter 18, a source of range data 19, a correlator 20, a second demultiplexer 21, a second multiplexer 22, a second telemetry transceiver 23 and a second telemetry antenna 24. The range data 19 can be obtained from sources not shown such as a tracking radar, or if the transmitting location is on the ground and the target is an aircraft, a radio altimeter or a barometric altimeter on the target, or other means.

Each antenna 1 can consist of a single radiator of electromagnetic waves or a plurality of such radiators grouped together. Each antenna 1 has associated with it a radio frequency amplifier 3, a phase shifter 4 and a control circuit 5. Each control circuit 5 has a unique address and contains an accumulator whose contents can be increased or decreased by inputting a positive or a negative number. The contents of the accumulator produce a substantially linear change in the phase delay through the associated phase shifter 4, with a scaling factor such that when the accumulator changes from full to empty the phase delay changes by substantially 360°. The contents of the accumulator can also be changed in synchronism with an applied modulating waveform so that the phase delay through the phase shifter is increased and decreased by 90°.

In FIG. 2, radio frequency exciter 6 supplies power 25 at the desired carrier frequency to the phase shifters 4, each of which according to the state of its associated control circuit 5 controls the phase of the carrier power 26. The carrier power 26 goes to an associated radio frequency amplifier 3 which amplifies the power to the desired level and sends such amplified power 27 to its associated antenna 1. Central controller 7 sends address 28 to first multiplexer 9 and also to first selector switch 13 to select the control circuit 5 which has that address. Waveform generator 8 sends a modulation waveform 29 to first multiplexer 9 and also through selector switch 13 to the selected control circuit 5 which by means of associated phase shifter 4 causes the phase of the signal radiated by associated antenna 1 to be advanced and retarded alternately by 90° in synchronism with the modulation waveform. First multiplexer 9 combines modulation waveform 29 with address 28 to make a telemetry signal for transmission through first transceiver 11 and first telemetry antenna 12 to the target 2.

At the target 2, the telemetry signal is received by second telemetry antenna 24 and second transceiver 23 and separated by second demultiplexer 21 into address 33 and modulation waveform 34, both delayed by time of flight from transmitting location to target.

At target 2, the combined signal from all the antennas 1 is picked up by monitor antenna 16 and passed to AM receiver 17, which detects the amplitude 35 of the combined signal. High pass filter 18 passes the alternating component 36 of amplitude 35 to correlator 20. Correlator 20 accepts alternating component 36 and delayed modulation waveform 34 from second demultiplexer 21, multiplies them, averages the product, and multiplies the product by range data 19 to give output 37. The output 37 of correlator 20 is passed to multiplexer 22, combined with delayed address 33 to form signal 38 which is transmitted to the transmitting location by second transceiver 23 and second telemetry antenna 24.

At the transmitting location, first telemetry antenna 12 receives the signal and transceiver 11 sends its output to first demultiplexer 10, which extracts address 40 and error signal 41 from the received signal. Arcsine circuit 14 accepts error signal 41, modifies it to 42 and passes signal 42 to second selector switch 15. Address 38 (doubly delayed from address 28 by time of flight to target and back) causes second selector switch 15 to select the same control circuit 5 which was selected previously by first selector switch 13. The output 42 of arcsine circuit 14 is sent by second selector switch 15 to the selected control circuit 5 to correct the phase of the signal radiated by the associated antenna.

Figure 3:
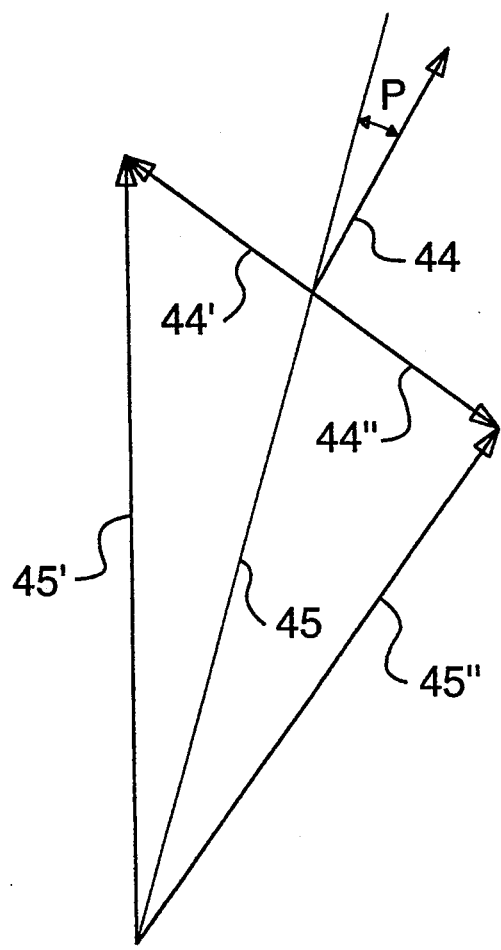
FIG. 3 shows, in a phasor diagram, the phase relationships between fields at the target.

The means by which my invention adjusts and optimises the phase of every antenna 1 in the array is as follows. In FIG. 3, 44=field from antenna 1n, unmodulated condition
44'=field from antenna 1n, phase advanced 90°
44"=field from antenna 1n, phase retarded 90°
45=combined field from all antennas 1 except 1n
45'=combined field from all antennas with 1n phase advanced
45"=combined field from all antennas with 1n phase retarded If fields 44 and 45 are not in phase, then the selected antenna 1n is not making the maximum possible contribution to the field at the target 2: the phase difference between fields 44 and 45 is known as the "phase error" P of the selected antenna. When the phase shifter 4 associated with the selected antenna in is being modulated, the field received at the monitoring antenna from the selected antenna in alternates between 44' and 44". The combined field from all the antennas alternates between 45' and 45". AM receiver 17 detects the amplitudes of 45' and 45". The magnitude of the change between amplitudes 45' and 45" is proportional to the sine of the phase error P multiplied by the amplitude of the field 44, and the direction of the change depends on whether 44 is retarded or advanced in phase relative to 45, in other words, whether P is positive or negative.

Referring to FIG. 2 again, the amplitude of output 36 of high pass filter 18 is proportional to the sine of the phase error P and to the amplitude of the field 44, and is applied to correlator 20. The amplitude of the field 44 is inversely proportional to the distance between the selected antenna 1 and monitor antenna 16: this distance is essentially the same as range data 19. Correlator 20 multiplies output 36 of high pass filter 18 by delayed modulation waveform 34 from demultiplexer 21, time averages the result and multiplies it by range data 19. The output 37 of correlator 20 is essentially sin P and is combined with the delayed address 33 from second demultiplexer 21 in second multiplexer 22 to make signal 38, which is sent by second telemetry transceiver 23 and second telemetry antenna 24 to the transmitting location. The signal received by first telemetry antenna 12 is passed to first transceiver 11, whose output 39 is essentially the same as 38, but further delayed by time of flight from target to transmitting location. Demultiplexer 10 separates output 39 into the address 40 which is passed to second selector switch 15 which selects the control circuit which has that address, and error signal 41 which is essentially sin P and is fed to the arcsine circuit 14. The output 42 of arcsine circuit 14 goes through second selector switch 15 to the selected control circuit 5 and causes the unmodulated phase of associated phase shifter 4 to be changed accordingly.

Referring to FIG. 4, the output 37 of correlator 20 is plotted against phase error P, and is a sine function of phase error P. In FIG.5, the output 42 of the arcsine circuit 14 is plotted against phase error P, and is a linear discontinuous function. If the phase error P was between −90° and +90°, the output 42 of arcsine circuit 14 essentially completely removes the error P in the radiated signal. If the original error was between −180° and −90° or between +90° and +180°, the error P is partially removed: after one or more repetitions of the process, the error is essentially completely removed.

Central controller 7 selects each control circuit 5 and its associated phase shifter 4 and antenna 3 in turn. When it has selected all of them, it repeats the process continually. Thus as the target vehicle moves, the array of antennas is continually adapted to maximise the field at the vehicle 2.

When the system is first switched on, the phases may be completely unrelated to those required to produce a beam pointing at the target. However, monitoring antenna 16 receives some combined signal from the array of antennas 1: each phase shifter 4 in turn is adjusted if required so that the field that its associated antenna 1 produces at monitoring antenna 16 is in phase with the combined signal of the other antennas, and after every antenna 1 has been adjusted several times, a concensus is reached, with the fields from all antennas 1 substantially in phase at the target 2.

During normal operation, the target 2 is moving in a substantially predictable path, typically in a circular path at constant speed. Then phase error P of each antenna 1 changes in a predictable way. Each control circuit 5 can contain a tracking circuit of any suitable kind which applies phase correction continuously according to the prediction. Ideally, phase shifters 4 change continuously to keep the fields from all antennas 1 in phase at the target 2. Then, whenever a control circuit 5 is addressed, any residual error (caused by a non-ideal prediction algorithm or by a change of flight parameters or any other reason) is corrected and the parameters of the tracking circuit changed accordingly.

In the preferred embodiment of my invention, the following conditions apply. The modulating waveform 29 is a square wave of constant amplitude, but not of constant frequency: in order to minimise the effects of accidental or deliberate interference, it is a random or pseudo-random waveform. The average frequency of waveform 29 is in the order of 1 MHz, depending on the number of antennas 1 in the array and the speed of the target 2. The output 36 of the high pass filter 18 is also a square wave essentially synchronous with delayed waveform 34. The amplitude of signal 36 is proportional to sin P and inversely proportional to range, and therefore the product of signals 34 and 36 is also. This product is converted to digital form by an analog-to-digital converter in correlator 20: range data 19 is also digital and a digital multiplier in correlator 20 produces output 37 (which is essentially sin P) in digital form. Arcsine circuit 14 contains a "look-up" table and its input 41 and output 42 are both digital. Address 28 and all quantities in control circuits 5 are in digital form. The two multiplexers 9 and 22 use frequency division to combine their inputs. However there are many other possible configurations: for example, some analog quantities could be digital, or some digital quantities could be analog.

What I claim is:

1. In a system for supplying power to a remote moving vehicle capable of receiving microwave power radiated from an array at a transmitting station to which said vehicle is not physically connected, a system for continually adjusting the phases of the antennas in said array to steer and focus the beam radiated by the array so that it follows the target, comprising:

(a) a plurality of antennas each having a unique address;

(b) a source generating radio frequency power which is distributed to said antennas;

(c) for each said antenna, an amplifier effective to amplify said power from said source and to apply it to said antenna, a phase shifter effective to shift the phase of said radio frequency power radiated by said antenna relative to the source and to modulate the phase of the radiated power rapidly, a controller effective to control said phase shifter, said controller causing said relative phase to remain constant except when said phase shifter is selected to be phase modulated and except when it is selected to have said relative phase corrected;

(e) a waveform generator effective to generate a pseudo-random alternating square waveform;

(f) a first switch effective to select in response to the address selected by said timer any one of said antennas and causing its said phase controller and phase shifter to phase modulate said relative phase rapidly by plus or minus 90 degrees away from its said present relative phase in response to said alternating waveform;

(g) a detector on said vehicle effective to detect changes in the magnitude of the power received at the vehicle, the system being such that a change in said relative phase at any selected antenna is effective to change said power received at the vehicle;

(h) ranging means to determine the approximate distance between said target and said antennas and to generate a distance signal;

(i) a first telemetry transceiver and first telemetry antenna at the transmitting station and a second telemetry antenna and second telemetry transceiver on the vehicle which are effective to convey the address of said selected antenna from said timer and said alternating waveform from said waveform generator to said target;

(j) a correlator on said target which is effective to derive an error signal by multiplying said changes in magnitude by said alternating waveform received through said transceivers, time average the result, multiply said average by said distance signal and to transmit said error signal together with said address of said selected antenna to the transmitting station through said telemetry transceivers and antennas;

(k) a converter which is effective to calculate the inverse sine of the error signal received at the transmitting station through said telemetry transceivers and antennas to provide a correction signal;

(l) a second switch which is effective to select said antenna specified by said address received from said vehicle and applying said correction signal to controller of said selected antenna to increase or decrease said present phase shift to a new value in order to maximise said combined-magnitude at said vehicle;

the timer is effective to cycle through all the antennas so rapidly that each antenna spends only such a short time period in the unselected condition that in relation to the number of antennas, and to the speed and range of the vehicle, when that antenna next adopts the selected condition the required change in the phase-angle of the power transmitted through the antenna in order to maximise the combined-magnitude, is less than 90 degrees;

all said means combining to form a closed feedback loop which maximises the ratio of said combined-magnitude at said vehicle to the total power radiated by said array.

2. In a system for supplying power to a remote moving vehicle:

(a) the system includes a transmitting station, comprising an army of several antennas and a power source which is effective to supply power at radio frequency to the antennas;

(b) the system is of the kind in which the vehicle moves relative to the transmitting-station, and in which the vehicle Is remote from, and physically unconnected with, the transmitting-station, and in Which the vehicle is capable of receiving power transmitted from the antennas at the transmitting-station;

(c) in respect of each antenna, the relative phase angle of that antenna is the phase angle of the power transmitted from that antenna relative to the source, and the system Is arranged for progressively correcting the relative phase angle of each antenna so as to maximise the magnitude of the combined power, termed the combined-magnitude, received at the vehicle from the several antennas:

(d) each antenna is capable of adopting a selected condition and an unselected condition;

(e) the system includes a timer, which is effective to cycle through fie several antennas at the transmitting-station, setting each antenna in turn to the selected condition;

(f) the system includes a phase controller;

(g) the system includes a waveform generator;

(h) in respect of each antenna when selected by the timer the phase-controller is effective to Induce phase modulation of the power transmitted by that antenna in accordance with the waveform generated by the waveform generator;

(i) the system is such that a change in the relative-phase-angle of the power transmitted from the selected antenna is effective to change the combined-magnitude of the power received at the vehicle;

(j) the system Includes a combined-magnitude-variation-detector, which is effective to detect and measure the magnitude and sign of a variation in the combined-magnitude, being a variation of the kind that results from modulation of the relative phase-angle of the selected antenna;

(k) the detector Is effective to generate a combined-magnitude-variation signal, being a signal which corresponds in magnitude and sign to the magnitude and sign of the said variation in the combined-magnitude;

(l) the system includes a ranging means for measuring the range from the transmitting-station to the vehicle, and for generating a range-signal in accordance with the range;

(m) the system includes a correlator, which is adapted to receive the combined-magnitude-variation signal and the waveform from the waveform generator and the range-signal, and is adapted to derive from a multiplication thereof an error signal and the system includes means for transmitting the variation signal, the range signal and the waveform to the correlator;

(n) the correlator is so arranged that the magnitude and sign of the error signal correspond to the magnitude and sign of the change in the combined-magnitude resulting from the change of phase-angle at the active antenna;

(o) the phase-controller is capable of receiving the error signal from the correlator, and is effective, upon receipt of the error signal, to make a change, being a correction, to the relative-phase-angle of the power transmitted through the selected antenna in accordance with the error signal, the magnitude and sign of the correction being such as to increase the combined-magnitude;

(p) the timer is effective to cycle through all the antennas so rapidly that each antenna spends only such a short time period in the unselected condition that in relation to the number of antennas, and to the speed and range of the vehicle, when that antenna next adopts the selected condition the required correction to the phase-angle of the power transmitted through the antenna in order to maximise the combined-magnitude, is less than 90 degrees.

3. A system as in claim 2, in which In respect of each one of the antennas, as that one antenna is set by the timer to the selected condition, the waveform generated by the waveform generator is effective to produce modulation of the relative-phase-angle of that antenna, being excursions from the relative-phase-angle that was the relative-phase-angle when thin antenna was last in the unselected condition, the said excursions being both positive and negative with respect to that unmodulated phase angle.

4. A system as in claim 3, in which the correlator is located at the vehicle, and a telemetry transmitter and antenna at the vehicle and a telemetry receiver and antenna at the transmitting station are effective to convey the error signal from the correlator to the transmitting station.

5. A system as in claim 4, in which the function of the phase controller is performed by several phase controllers, one for each antenna, each phase controller being effective to control the phase shifter and phase modulator assigned to that antenna.

6. A system as in claim 5, in which:
(a) a second telemetry transmitter is located at said transmitting station;
(b) a second telemetry receiver and said (correlation means) correlator are located at said (target) vehicle;
(c) said second telemetry transmitter and said second telemetry receiver convey said waveform from said waveform (generating means) generator to said (correlation means) correlator;
(d) said first telemetry transmitter and said first telemetry antenna convey said (correction) error signal from said (correlation means) correlator to said transmitting (location) station.

7. A system as in claim 6 in which the address of said selected antenna is conveyed from said transmitting location to said target and back to said transmitting location by said telemetry transmitters, receivers and antennas.

8. A system as in claim 5, in which said phase modulation waveform is substantially a square wave.

9. A system as in claim 8, in which said phase modulation is substantially plus and minus 90 degrees.

10. A system as in claim 9 in which said modulation waveform is random.

11. A system as in claim 9, in which said modulation waveform is pseudo-random.

12. A system as in claim 11 containing a converter which is effective to modify the error signal by application of an inverse sine function to create a correction signal and to transmit the correction signal to the phase controller to change the relative phase of said previously modulated antenna to increase the combined-magnitude at said vehicle.

13. A system as in claim 5 in which said phase controller of each said antenna contains a tracking means such that as the relative position between said target and said transmitting location changes said tracking means predicts the required changes in said relative phase and applies them substantially continuously at times other than the occasions when said antenna is selected so that the antennas need to be phase modulated less frequently while still causing said combined field at said target to be maximised.

* * * * *